United States Patent Office 3,264,259
Patented August 2, 1966

3,264,259
ORGANOPOLYSILOXANES
Tse C. Wu, Waterford, N.Y., assignor to General Electric Company, a corporation of New York
No Drawing. Filed Aug. 1, 1963, Ser. No. 299,195
7 Claims. (Cl. 260—46.5)

This invention relates to new and useful silicone polymers. More particularly, it relates to linear polymers made of repeating units such as disiloxane units of various types linked together through the medium of the silicon-silicon bond It is well known that the silicon-silicon bond is weaker than the silicon-oxygen bond and that no relatively long chain polysilanes equivalent to analogous hydrocarbon materials have been successfully synthesized. Attempts have been made to stabilize the silicon-silicon bond by introducing suitable side groups on the silicon atoms. Thus, a number of organopolysilanes, such as hexyphenyldisilane and the like, are known to be chemically and thermally stable, such material melting without decomposition at 370° C. and being inert to oxygen, iodine, concentrated sulfuric acid and a number of other chemicals. The properties of some organic disilanes of this type are summarized in chapter 12 of C. Eaborn's Organosilicon Compounds, Butterworths Scientific Publications, 1960.

A principal object of this invention, therefore, is to provide new and useful silicone polymers comprising siloxane units which are linked together by the relatively more stable silicon-silicon bond.

Briefly, the invention relates to linear chain polymers of the type described above which are characterized by the general formulas:

(I)

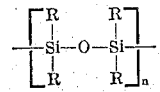

and (II)

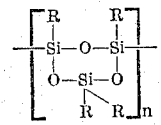

where R is the same or different aromatic groups, such as phenyl, tolyl, xylyl, biphenylyl, phenoxyphenyl, halogenated phenyl and other substituted aromatic groups, as well as aliphatic groups such as methyl, ethyl, and the like and substituted aliphatics and $n$ is a number more than 1, e.g., from 3 to 50 or more. It will be realized, of course, that R may be the same or different organic aromatic or substituted aromatic groups to provide a wide variety of products. Likewise, the present invention encompasses block copolymers containing blocks of two or more of the units of Formula I. Likewise, the present invention encompasses copolymers wherein the present silicon-silicon bond linked disiloxane units are copolymerized with polysiloxane materials, which copolymers can be represented by the formula:

(III)

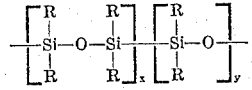

where the R groups are as described above and $x$ is a number more than one, e.g., from 3 to 50 or more and $y$ is a positive integer having a value of from 1 to 1,000 or more.

It will be, of course, understood that the R groups set forth herein can be the same or different constituents to produce a wide variety of products. They can also represent a functional group such as an ethoxyl group to provide sites for cross linking.

Those features of the invention which are believed to be novel are set forth with particularity in the claims appended hereto. The invention will, however, be better understood and further advantages thereof appreciated from a consideration of the following description.

The following examples illustrate the preparation of materials according to this invention and are to be taken as exemplary only of the practice of the invention.

Example 1

There was prepared 1,3-dichloro-1,1,3,3-tetraphenyldisiloxane according to the Journal of the American Chemical Society 67, 2173 (1945), by dissolving diphenyldichlorosilane in ether to which was added dropwise, with stirring, water dissolved in dioxane. The hydrogen chloride was carried off with dry nitrogen and the ether and dioxane removed by distillation. The residue was distilled under vacuum to give a liquid product boiling at 206–208° at 5 microns of pressure.

In a 3 necked flask equipped with a condenser and a drying tube there were added 45.2 parts of the 1,3-dichloro-1,1,3,3-tetraphenyldisiloxane along with 4.8 parts of sodium and 20 parts of xylene, the reaction mixture being stirred at the refluxing temperature for a total of 13 hours. The mixture was then cooled to room temperature and filtered, the residue being treated with 200 parts of methyl alcohol in order to destroy any unreacted sodium. The reconstituted slurry was washed with a mixture of methyl alcohol and water in a volume ratio of 1 to 4, washed with acetone, and dried to give 4.5 parts of white powder which decomposed at 450° C. The material was slightly soluble in hot diphenyl ether. Upon analysis, the material was found to contain 75.46 percent carbon as against a theoretical 75.79 percent; 5.42 percent hydrogen as against a theoretical hydrogen content of 5.26 percent and 14.76 percent silicon as against a theoretical 14.8 percent and corresponds to the formula:

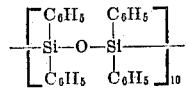

Example 2

Example 1 was repeated using in lieu of 1,3-dichloro-1,1,3,3-tetraphenyldisiloxane, 10.1 parts 1,3-dichloro-1,1,3,3-tetraparatolyldisiloxane with 1.1 parts of sodium and 50 parts of xylene with refluxing for five hours to produce a polymer having the formula:

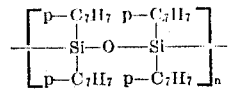

where $n$ is about 15. The product was insoluble in the usual organic solvents such as acetone, benzene and ethanol. It was soluble in hot diphenyl ether.

Example 3

There were mixed together a solution containing 54.1 parts of diphenylsilanediol, 350 parts of anhydrous ether and 90 parts of tetrahydrofuran to a mixture containing 92.1 parts of 1,3-diphenyl-1,1,3,3-tetrachlorodisiloxane prepared according to JACS 67, 2173 (1945) and 350 parts of anhydrous ether and 40 parts of pyridine as an acid acceptor.

The addition reaction took place at room temperature in about two hours, and after the reaction mixture had been allowed to stand for about 16 hours, the pyridine hydrochloride formed was removed by filtration. After the removal of solvents from the filtrate, the remaining oily residue was purified by molecular distillation. Fractions collected at 200° C. and 2×10⁻⁵ mm. were examined by IR spectroscopy methods which showed an absorption band, indicating the formation of a phenyl-cyclic trimer structure.

The 1,5 - dichloro - 1,3,3,5 - tetraphenylcyclotrisiloxane was then heated with an excess of sodium and refluxing xylene for 5 hours. After the reaction mixture had been washed to remove the NaCl formed, the product was found to be a white solid which was practically insoluble in most organic solvents such as benzene, ethyl alcohol, acetone, chloroform, etc. It was slightly soluble in hot diphenyl ether. Upon heating, this material did not melt but gradually discolored at a temperature of about 500° C. It burned slowly in a flame but was not self-supporting. The product has the formula:

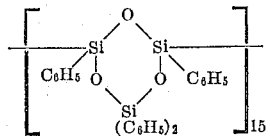

*Example 4*

Example 3 was repeated using in lieu of 1,5-dichloro-1,3,3,5 - tetraphenylcyclotrisiloxane, 1,5 - dichloro - 1,5-diphenyl-3,3-di-p-tolylcyclotrisiloxane to produce a product having the formula:

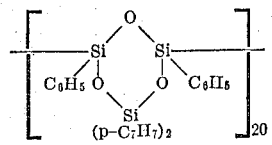

The present materials are useful in many applications. For example, when mixed with thermoplastic silicone materials, they are useful in increasing their softening temperatures. When mixed with silicone fluids they increase the viscosity of such fluids at high temperatures where such high viscosities are desired. These materials are also blended with silicone oils to produce useful silicone greases. Other uses will occur to those skilled in the art.

What I claim as new and desire to secure by Letters Patent of the United States is:

1. A polymeric material consisting essentially of from about 3 to 50 recurring units selected from the class consisting of:

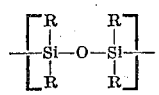

and

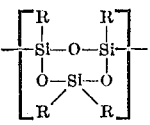

where R is a member selected from the class consisting of phenyl, tolyl, xylyl, biphenyl, phenoxyphenyl, halogenated phenyl, methyl, and ethyl radicals.

2. A polymeric material consisting essentially of from about 3 to 50 of the following recurring units:

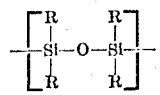

where R is a member selected from the group consisting of phenyl, tolyl, xylyl, biphenyl, phenoxyphenyl, halogenated phenyl, methyl, and ethyl radicals.

3. A polymeric material consisting essentially of from about 3 to 50 of the following recurring units:

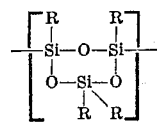

where R is a member selected from the group consisting of phenyl, tolyl, xylyl, biphenyl, phenoxyphenyl, halogenated phenyl, methyl, and ethyl radicals.

4. A polymeric material consisting essentially of from about 3 to 50 of the following recurring units:

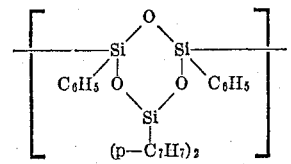

5. A polymeric material consisting essentially of from about 3 to 50 of the following recurring units:

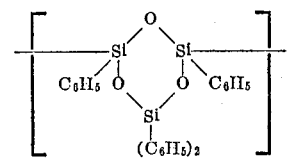

6. A polymeric material consisting essentially of from about 3 to 50 of the following recurring units:

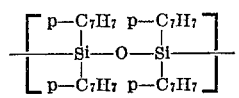

7. A polymeric material consisting essentially of from about 3 to 50 of the following recurring units:

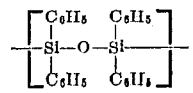

References Cited by the Examiner
UNITED STATES PATENTS
2,467,177    4/1949    Zimmer _____ 260—46.5

LEON J. BERCOVITZ, *Primary Examiner.*
M. I. MARQUIS, *Assistant Examiner.*